United States Patent
Kim et al.

(10) Patent No.: US 10,059,804 B2
(45) Date of Patent: Aug. 28, 2018

(54) POLYMER, HYDROGEL INCLUDING THE POLYMER AND MANUFACTURING METHOD OF THE HYDROGEL

(71) Applicant: RESEARCH & BUSINESS FOUNDATION SUNGKYUNKWAN UNIVERSITY, Suwon-si (KR)

(72) Inventors: Ji Heung Kim, Suwon-si (KR); Bich Ngoc Tran, Pohang-si (KR); Youn Chul Kim, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 15/274,369

(22) Filed: Sep. 23, 2016

(65) Prior Publication Data

US 2017/0088680 A1    Mar. 30, 2017

(30) Foreign Application Priority Data

Sep. 25, 2015  (KR) .......... 10-2015-0135987

(51) Int. Cl.
| | |
|---|---|
| *C08G 69/00* | (2006.01) |
| *C08G 69/10* | (2006.01) |
| *C08J 3/075* | (2006.01) |
| *C08G 18/60* | (2006.01) |
| *C08G 18/73* | (2006.01) |
| *C08G 69/08* | (2006.01) |
| *C08G 73/10* | (2006.01) |

(52) U.S. Cl.
CPC ........... *C08G 69/10* (2013.01); *C08G 18/603* (2013.01); *C08G 18/73* (2013.01); *C08G 69/08* (2013.01); *C08G 73/1092* (2013.01); *C08J 3/075* (2013.01); *C08G 2210/00* (2013.01); *C08J 2377/00* (2013.01)

(58) Field of Classification Search
None
See application file for complete search history.

(56) References Cited

FOREIGN PATENT DOCUMENTS

KR    10-2010-0025320 A    3/2010

OTHER PUBLICATIONS

Kwangwon Seo: "Phase Transition Behavior of Novel pH-Sensitive Polyaspartamide Derivatives Grafted with 1-(3-Aminopropyl) imidazole", Macromolecular Bioscience, vol. 6, No. 9, Sep. 15, 2006 (Sep. 15, 2006), pp. 758-766.*

Vlasak, J. et al. "Properties and Reactivity of Polysuccinimide", Journal of Polymer Scinece: Polymer Symposium, vol. 66, 1979, pp. 59-64.

Tran, Ngoc Bich, Preparation and Properties of Novel Co2- Responsive Hydrogel Based on Polyaspartamide Derivatives, Polymer Society of Korea Abstract, Apr. 10, 2015, (5 pages in Korean and English).

* cited by examiner

*Primary Examiner* — Ana L. Woodward
(74) *Attorney, Agent, or Firm* — NSIP Law

(57) ABSTRACT

There is provided a novel polymer including a repeating unit expressed as a following formula 1:

[formula 1]

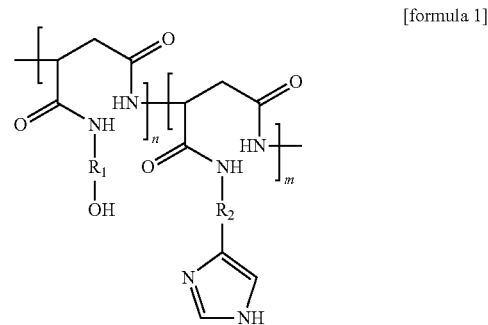

where each of $R_1$ and $R_2$ independently represents an alkylene group with 2 to 6 carbon atoms, and each of n and m independently represents 10 to 10,000.

16 Claims, 13 Drawing Sheets

POLYMER, HYDROGEL INCLUDING THE POLYMER AND MANUFACTURING METHOD OF THE HYDROGEL

CROSS-REFERENCE TO RELATED APPLICATION

This application claims the benefit of Korea patent application No. 10-2015-0135987 filed on Sep. 25, 2015, the entire content of which is incorporated herein by reference for all purposes as if fully set forth herein.

BACKGROUND

Field of the Present Disclosure

The present disclosure relates to a novel polymer, a hydrogel including the polymer, and a method for producing the hydrogel, and more specifically, to a novel stimulus-responsive polymer, a hydrogel including the polymer, and a method for producing the hydrogel.

A drug delivery system (DDS) may refer to a system to adjust a discharge rate of a drug or deliver a drug to a target position effectively. This may minimize a side effect of a drug or maximize an efficacy thereof. However, a single-time delivery of a large amount of a drug may lead to a side effect. Therefore, recently, a controlled drug delivery system receives attention. The controlled drug delivery system not only adjusts a drug amount reliably but also improves a lasting effect of a short-term functioning effect or reduce a side effect thereof.

The controlled drug delivery system has a stimulus-responsive smart polymer as a carrier, which may response to an external change. Among other things, a stimulus-responsive hydrogel may be employed in a bio-medical field, for example, as a carrier for a controlled drug discharge, a bio-medical sensor, or actuators, etc. Further, the stimulus-responsive hydrogel may be employed in a cosmetics field, to discharge a skin nutrient component in a controlled way or to keep a moisture on a skin. Further, the stimulus-responsive hydrogel absorbs or removes heavy metals for water purification.

SUMMARY

The present disclosure is to provide a novel polymer having a reversible $CO_2$ reactivity, a pH sensitivity, and/or a metal ion absorption.

Further, the present disclosure is to provide a novel hydrogel including the polymer.

Furthermore, the present disclosure is to provide a method for producing the hydrogel.

In one aspect of the present disclosure, there is provided a polymer including a repeating unit expressed as a following formula 1:

[formula 1]

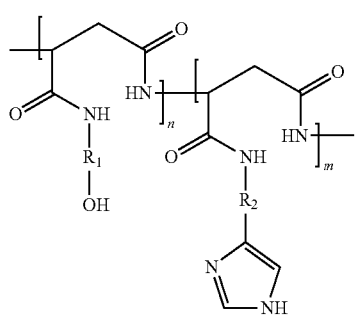

where each of $R_1$ and $R_2$ independently represents an alkylene group with 2 to 6 carbon atoms, and each of n and m independently represents 10 to 10,000.

In one implementation, the formula 1 is expressed as a following formula 2;

[formula 2]

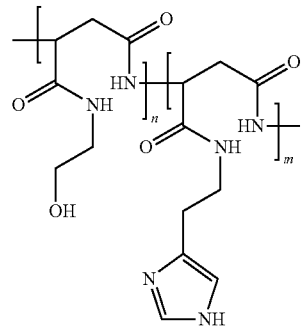

wherein, in the formula 2, each of n and m independently represents 10 to 10,000.

In one aspect of the present disclosure, there is provided a hydrogel including a repeating unit expressed as a following formula 3:

[formula 3]

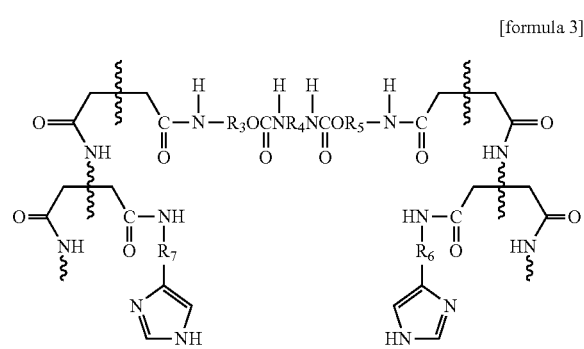

where, each of $R_3$ and $R_5$ independently represents an alkylene group with 2 to 6 carbon atoms, $R_4$ represents an alkylene group with 1 to 12 carbon atoms or an arylene group with 6 to 14 carbon atoms, each of $R_6$ and $R_7$ independently represents an alkylene group with 2 to 6 carbon atoms.

In one implementation, the formula 3 is expressed as a following formula 4;

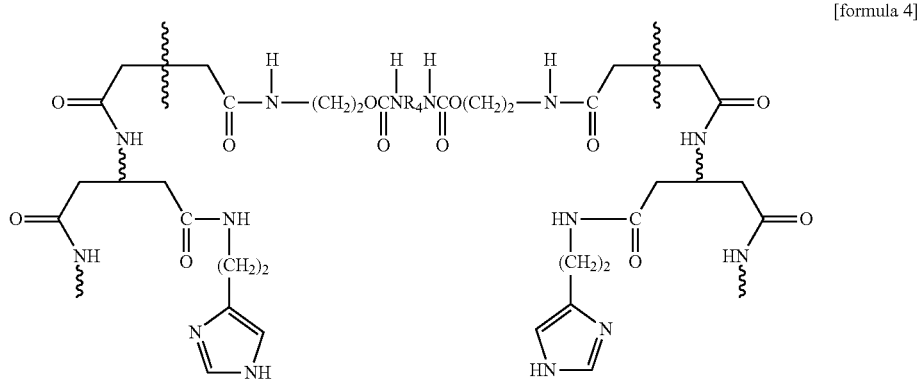

[formula 4]

wherein, in the formula 4, $R_4$ represents an alkylene group with 1 to 12 carbon atoms or an arylene group with 6 to 14 carbon atoms.

In one implementation, the hydrogel is formed by cross-linking a polymer including a repeating unit expressed as a following formula 1:

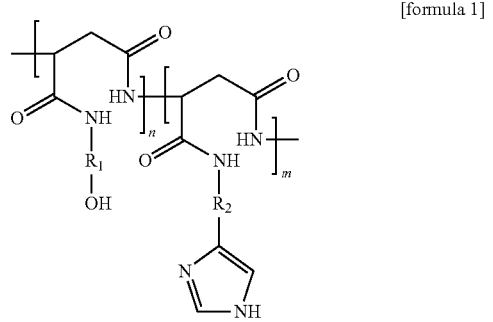

[formula 1]

wherein, in the formula 1, each of $R_1$ and $R_2$ independently represents an alkylene group with 2 to 6 carbon atoms, and each of n and m independently represents 10 to 10,000.

In one implementation, a swelling degree of the hydrogel varies based on pH of an aqueous solution wetting the hydrogel.

In one implementation, the variation of the swelling degree allows the hydrogel to act as a sensing material of a pressure sensor.

In one implementation, the hydrogel has a reactivity with $CO_2$ in an aqueous solution, wherein the $CO_2$ lowers pH of the aqueous solution, thereby to decrease a swelling degree of the hydrogel.

In one implementation, an inert gas in the aqueous solution raises pH of the aqueous solution, thereby to increase a swelling degree of the hydrogel.

In one implementation, the hydrogel absorbs a metal ion in an aqueous solution wetting the hydrogel.

In one implementation, the metal ion absorption of the hydrogel changes a swelling degree of the hydrogel.

In one implementation, the change in the swelling degree allows the hydrogel to act as a sensing material of a pressure sensor.

In one aspect of the present disclosure, there is provided a method for producing a hydrogel, the method comprising: (a) adding and reacting a histamine-based compound to and with polysuccinimide (PSI); (b) adding an aminoalcohol-based compound into the reaction in (a), to form a polymer solution containing a polymer including a repeating unit expressed as a following formula 1; and (c) adding hexamethylene diisocyanate into the polymer solution and cross-linking the polymer:

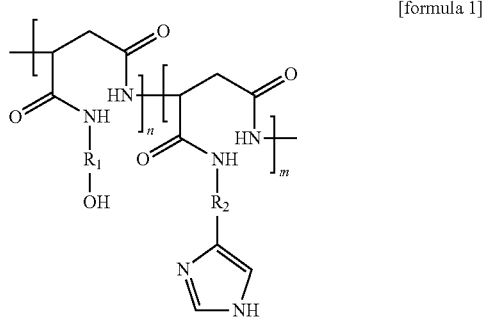

[formula 1]

where each of $R_1$ and $R_2$ independently represents an alkylene group with 2 to 6 carbon atoms, and each of n and m independently represents 10 to 10,000.

In one implementation, the method further comprises, prior to the (a), adding a phosphoric acid to an aspartic acid to form a mixture, and polymerizing the mixture to form the polysuccinimide.

In accordance with the present novel polymer, the hydrogel including the polymer, and the method for producing the hydrogel, there may be provided the polymer and hydrogel with the reversible $CO_2$-reactivity, the pH sensitivity, and the metal ion absorption. The present hydrogel may be easily obtained by cross-linking the present polymer. Further, using the reversible $CO_2$-reactivity, the pH sensitivity, and the metal ion absorption of the present hydrogel, the present hydrogel may act as a metal ion absorption material, a pH sensor, $CO_2$ reactivity and switching sensor, etc. Further, the present polymer and hydrogel may be hydrophilic, and may be bio-compatible, and, thus, may be used as a carrier of a controlled drug delivery system to discharge a drug in the body.

BRIEF DESCRIPTION OF DRAWINGS

Referring to FIG. 4.

DETAILED DESCRIPTIONS

Figure 1:
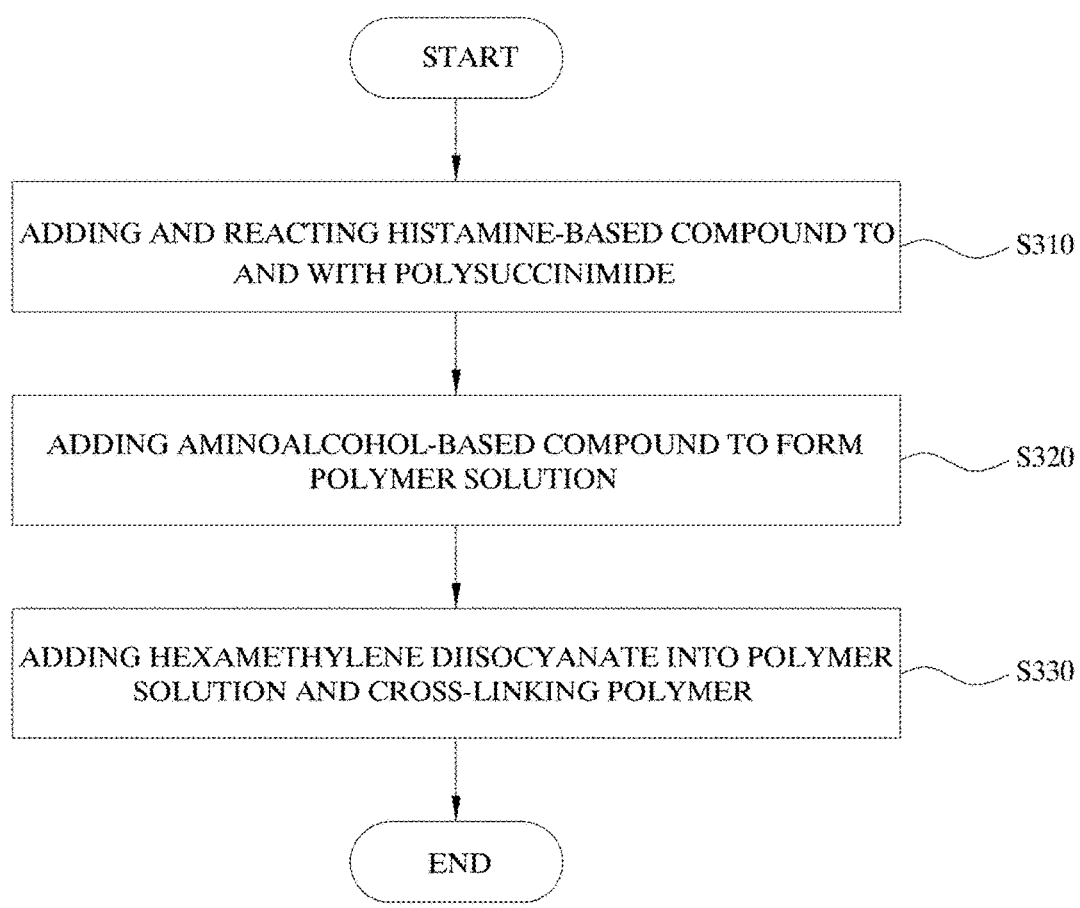
FIG. 1 shows a flow chart of a method for producing a hydrogel in accordance with the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, s, operations, elements, and/or components, but do not preclude the presence or addition of one or more other features, integers, s, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure."

The present novel polymer may include a repeating unit expressed as a following formula 1:

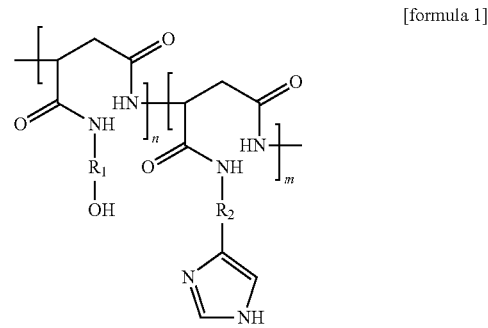

[formula 1]

where each of $R_1$ and $R_2$ independently represents an alkylene group with 2 to 6 carbon atoms, and each of n and m independently represents 10 to 10,000.

The alkylene refers to a bivalent saturated aliphatic radical regarded as derived from an alkene by opening of the double bond or from an alkane by removal of two hydrogen atoms from different carbon atoms. The alkylene group may include a methylene group, an ethylene group, a propylene group, etc.

In one example, when each of $R_1$ and $R_2$ is an ethylene group, the formula 1 may be expressed as a following formula 2:

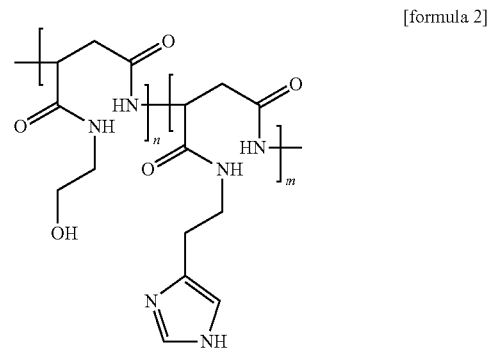

[formula 2]

where, in the formula 2, each of n and m independently represents 10 to 10,000.

In this connection, the polymer may be a copolymer, which includes poly(2-hydroxyethyl aspartamide-co-histamine aspartamide).

The polymer may be a polyaspartamide-based derivative. The poly aspartamide-based derivative may include wide ranges of polyaspartic acid amide derivatives produced using aminolysis reactions with polysuccinimide or secondary reactions with carboxylic pendant groups of a polyaspartic acid.

The present hydrogel may include a repeating unit expressed as a following formula 3:

[formula 3]

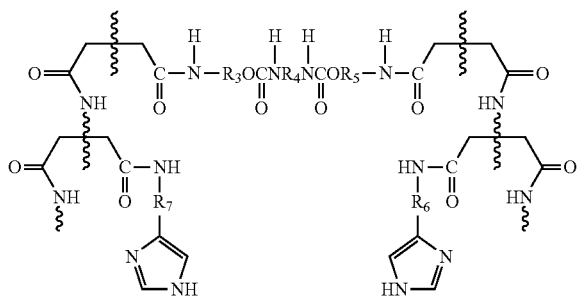

where each of $R_3$ and $R_5$ independently represents an alkylene group with 2 to 6 carbon atoms, $R_4$ represents an alkylene group with 1 to 12 carbon atoms or an arylene group 5 to 14 carbon atoms, each of $R_6$ and $R_7$ independently represents an alkylene group with 2 to 6 carbon atoms.

The arylene refers to a bivalent radical derived from an aromatic hydrocarbon by removal of a hydrogen atom from each of two carbon atoms of the nucleus. The arylene group may include a phenylene group, a naphtylene group, an anthracenylene group, etc.

In one example, when each of $R_3$, $R_5$, $R_6$ and $R_7$ is an ethylene group, the formula 3 may be expressed as a following formula 4:

[formula 4]

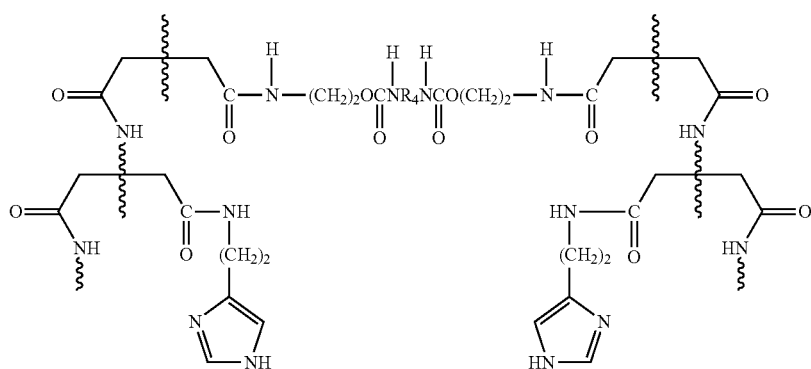

wherein, in the formula 4, $R_4$ represents an alkylene group with 1 to 12 carbon atoms or an arylene group 5 to 14 carbon atoms.

The hydrogel may include a polymer including a repeating unit expressed as the above formula 1. The hydrogel may be formed by cross-linking the polymer using hexamethylene diisocyanate (HMDI).

Referring to FIG. 1, a method for producing a hydrogel in accordance with the present disclosure will be described in details.

FIG. 1 shows a flow chart of a method for producing a hydrogel in accordance with the present disclosure.

Referring to FIG. 1, in order to produce the present hydrogel, first, a histamine-based compound may be added to and react with polysuccinimide (PSI) (S310).

In this connection, prior to S310, a phosphoric acid as both a solvent and a catalyst may be added to an aspartic acid and a mixture thereof may be polymerized, to obtain the polysuccinimide.

Subsequently, a aminoalcohol-based compound may be added into the reaction in S310, to acquire a polymer solution containing a polymer including a repeating unit expressed as the formula 1 (S320).

In this connection, the polymer may be formed by a consecutive aminolysis ring-open reaction between the polysuccinimide and histamine, and between the polysuccinimide and ethanolamine via the operations S310 and S320 respectively.

The polysuccinimide may change in the backbone thereof via various aminolysis reactions, to allow a formation of a functional polymer such as a hydrophilic-hydrophobic copolymer. For example, the aminolysis of the polysuccinimide may allow a formation of a polyaspartic acid (PASP). The polyaspartic acid may be sensitive and be absorbed to pH and electrolyte in water and bodily fluids via a neutralization and cross-linking.

The histamine may be an amidine (imidine→amidine) having an imidazole ring which may form a metal-ligand interaction with a metal ion.

Subsequently, hexamethylene diisocyanate may be added to the polymer solution, to cross-link the polymer (S330).

The polymer may be cross-linked by the hexamethylene diisocyanate to be gelated, to form a hydrogel.

Further, the hydrogel may be acquired by cross-linking the polymer including a repeating unit expressed as the formula 1 using the hexamethylene diisocyanate.

Figure 2:
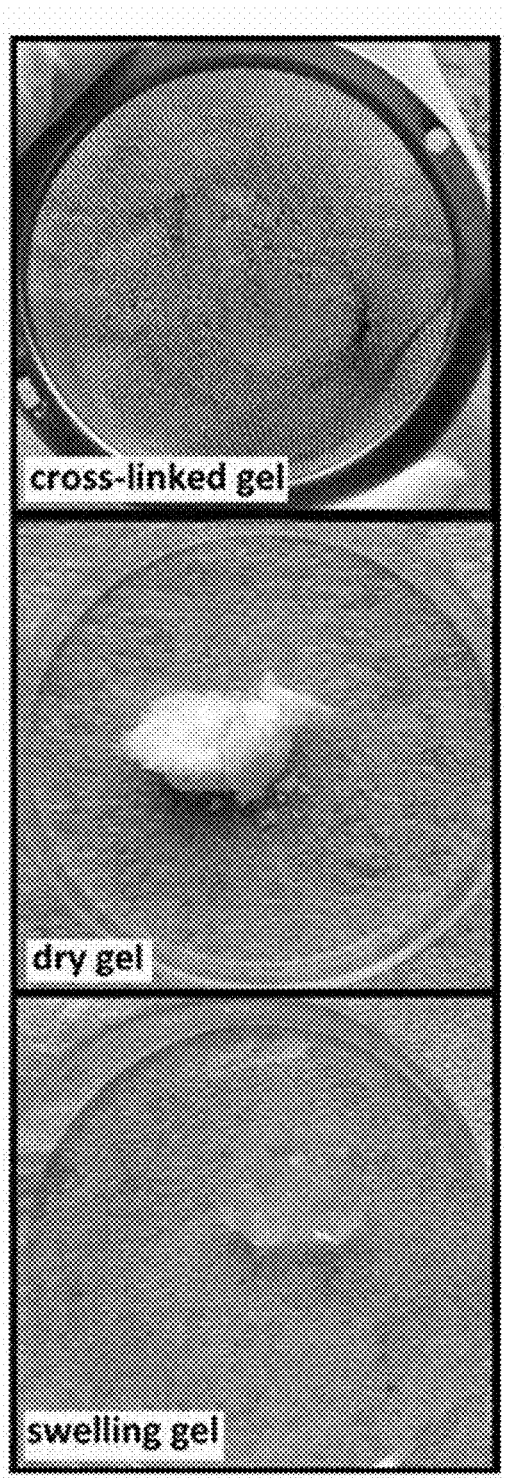
FIG. 2 illustrates the present hydrogel.

FIG. 2 illustrates the present hydrogel. In FIG. 2, a "cross-linked gel" indicates a hydrogel in accordance with one embodiment of the present disclosure; a "dry gel" indicates a dry hydrogel; a "swelling gel" indicates a swelling hydrogel.

Referring to FIG. 2, the present cross-linked hydrogel has a swelling property based on presence/absence of a heavy metal or a pH change.

Specifically, the hydrogel may be sensitive to pH of the aqueous solution. As the pH of the aqueous solution increases, the hydrogel has an increase in swelling.

Further, the hydrogel may have $CO_2$ reactivity and reversibility thereof in the aqueous solution. Specifically, the hydrogel may have a decrease in swelling, that is, a shrinkage, with reaction to the aqueous solution containing $CO_2$. Then, when the shrunk hydrogel reacts with the aqueous solution containing an alert gas, the hydrogel may swell. Thus, the reaction may be reversible. The inert gas may be chemically inactive and thus may not form a compound. An example thereof may include a gas belong to an eighteen group in a periodic table such as helium, neon, argon, krypton, xenon, radon, etc, or may include nitrogen. The reaction reversibility of the hydrogel will be described later in details.

Figure 3:
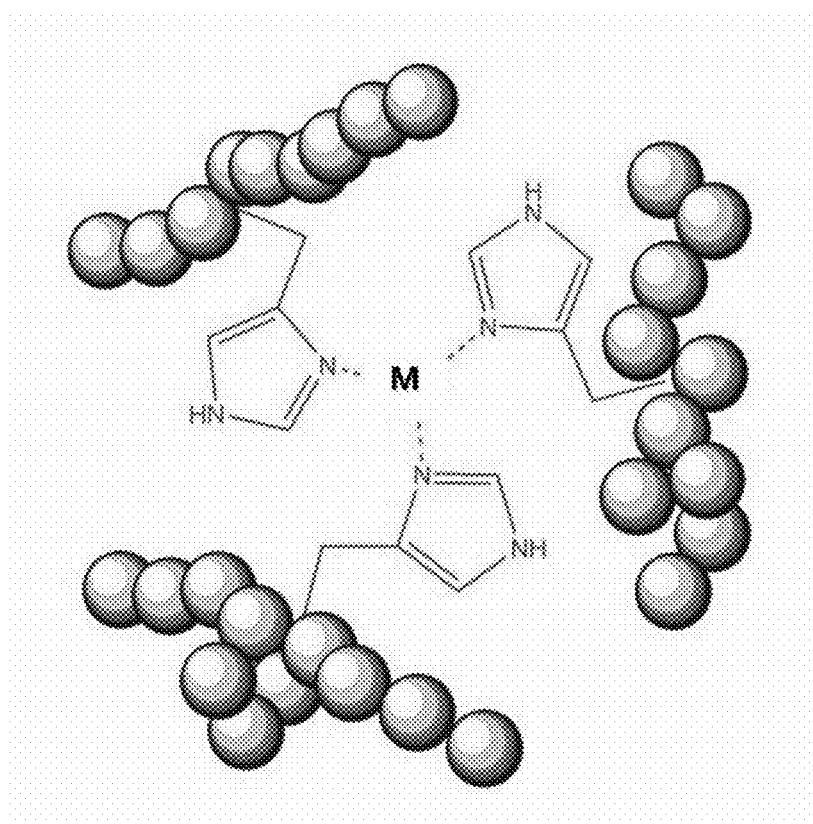
FIG. 3 illustrates metal ion absorption of the present hydrogel.

FIG. 3 illustrates metal ion absorption of the present hydrogel. In FIG. 3, M may refer to a metal ion. Referring to FIG. 3, the present hydrogel may have metal ion absorption.

Specifically, since the polymer backbone of the hydrogel includes an imidazole group, the metal ion may be absorbed to the hydrogel via a multivalent coordinate bond between the imidazole group and metal ion. The metal ion may include a heavy metal ion such as copper ions ($Cu^{2+}$), lead ions ($Pb^{2+}$), nickel ions ($Ni^{2+}$), etc. Further, the hydrogel having the metal ion absorption may have change in swelling.

Using the reversible $CO_2$-reactivity, the pH sensibility, and the metal ion absorption of the present hydrogel, the present hydrogel may act as a sensing unit of a pressure sensor, which may be based on a volume expansion due to the hydrogel swelling. Specifically, the present hydrogel may swell or shrink based on a specific pH change or whether a heavy metal is present or not. This volume change thereof may lead to a pressure change, which may allow the present hydrogel to act as the sensing unit of a pressure sensor.

Further, the hydrogel may be hydrophilic and biocompatible, and, thus, act as a carrier of a controlled delivery system for a drug, a skin nutrient component, etc. using the property thereof.

Hereinafter, various embodiments of the present novel polymer, the hydrogel including the polymer, and a method for manufacturing the hydrogel will be described below in details.

Production of PHEA-HIS in Accordance with Embodiment 1

In order to produce poly(2-hydroxyethyl aspartamide-co-histamine aspartamide) (hereinafter, PHEA-HIS), polysuccinimide (hereinafter, PSI) is formed.

L-aspartic acid 20 g and o-phosphoric acid 20 g are received in a round bottom flask and are agitated in a pressure-reduced state at 200° C. for 5 hours. The resultant mixture is cooled and, then, the cooled mixture is added to and dissolved in DMF (N,N-dimethylformamide). Subsequently, the resultant product is precipitated in a large amount of water. Then, the precipitate is cleaned using water many time to remove a phosphoric acid therefrom. Thereafter, the precipitate is dried under a vacuum at 80° C., to acquire PSI.

Subsequently, the PSI 0.5 g is dissolved in DMSO 15 mL to obtain a polymer solution. Histamine dihydrochloride 50 mol % and 1.8 mL $Et_3N$ are mixed in a vial and the mixture is heat at 70° C. Then, the mixture is added to the polymer solution. Subsequently, the mixed solution is agitated for 4 days. Then, a resultant polymer is cooled to a room temperature. The polymer is added to a large amount of ethanolamine, which is agitated for one day. The resultant final solution is subjected to dialysis to remove the remaining solvent.

Subsequently, the final product is freeze-dried under a vacuum to acquire PHEA-HIS of the present embodiment 1 at 80 to 85% yield.

Properties of PHEA-HIS

To examine properties of PHEA-HIS, $^1$H NMR spectrum and FT-IR spectrum thereof are checked, and comparison between PHEA-HIS and PSI is made based on the spectrum. The $^1$H-NMR spectrum thereof is obtained using a Bruker AMX-500 spectrometer using $D_2O$ as a solvent. The FT-IR spectrum thereof is obtained using an attenuated total reflection (ATR FT-IR) spectrometry (Bruker IFS 66/S, Germany). The spectral measurements are shown in FIG. 4 and FIG. 5 respectively.

Figure 4:
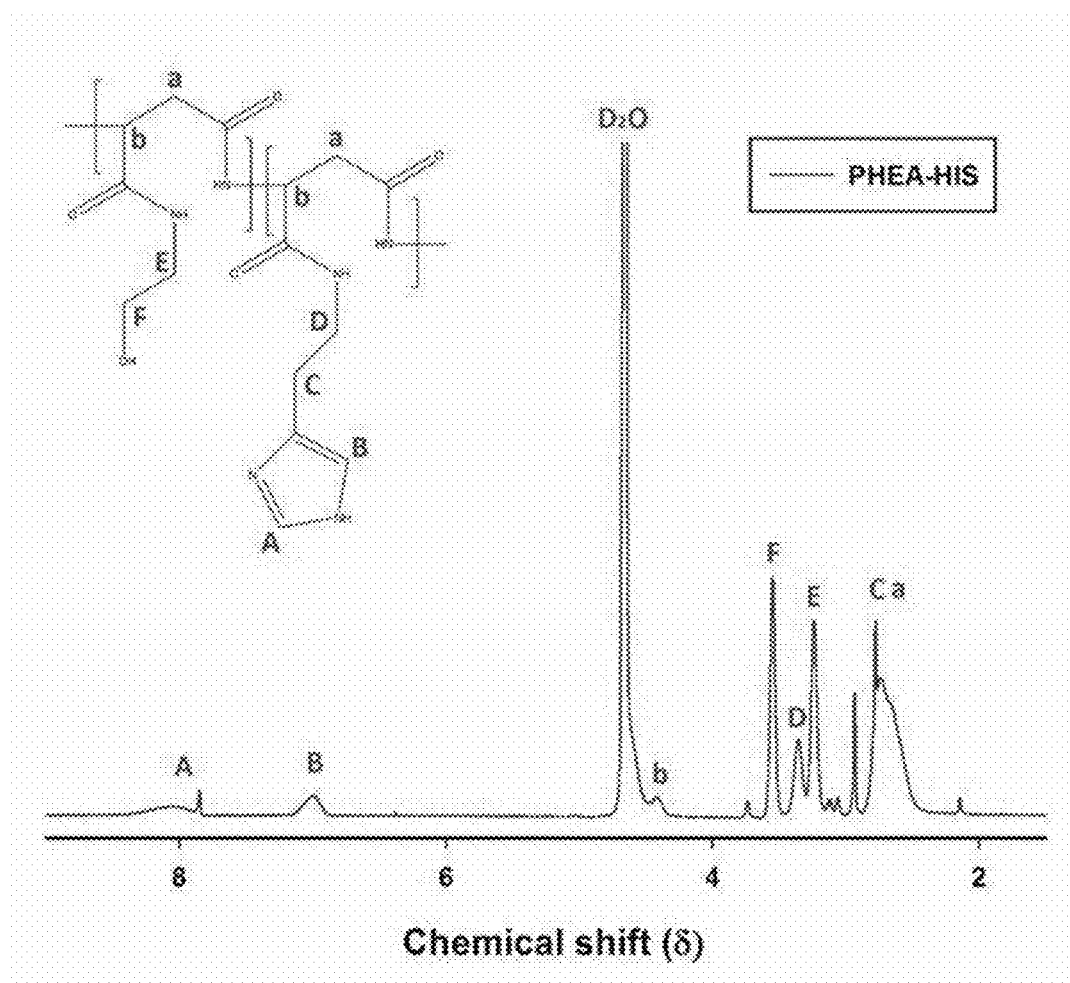
FIG. 4 illustrates the $^1$H NMR spectrum of PHEA-HIS.

FIG. 4 illustrates the $^1$H NMR spectrum of PHEA-HIS. Referring to FIG. 4, methylene proton peaks E and F in the $^1$H NMR spectrum of PHEA-HIS may correspond to pendent hydroxyethyl. The peaks A and B may correspond to two heteroaromatic proton singlets of an imidazole ring respectively. The peaks C and D may correspond to two methylene protons of a histamine group respectively.

A composition of each group of the PHEA-HIS is determined from an integration ratio between D (δ=3.28-3.45) and E (δ=3.15-3.28). It may be confirmed that the histamine group by about 30.3% is bonded to the polymer backbone.

Figure 5:
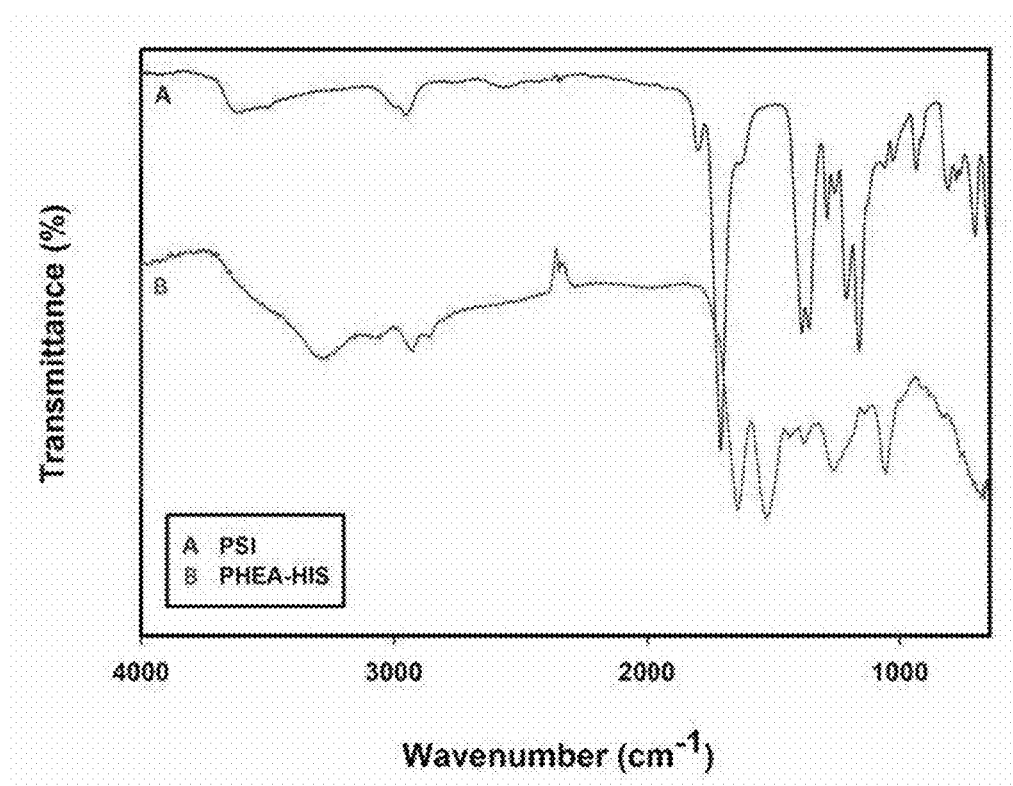
FIG. 5 illustrates the FT-IR spectra of PSI and PHEA-HIS.

FIG. 5 illustrates the FT-IR spectra of PSI and PHEA-HIS. In FIG. 5, A indicates the FT-IR spectrum of the PSI, B indicates the FT-IR spectrum of the PHEA-HIS. Referring to FIG. 5, the spectrum of the PSI shows a strong band property at a wavenumber 1726 $cm^{-1}$, which indicates an imide absorption. To the contrary, the strong band at 1726 $cm^{-1}$ disappears at the FT-IR spectrum of PHEA-HIS. That is, it may be confirmed that, using a difference between the FT-IR spectra between PSI and PHEA-HIS, the PSI and PHEA-HIS contain different contents % of the histamine group.

The FT-IR spectrum of the PHEA-HIS may show a strong band at 1633 $cm^{-1}$ wavenumber, which indicates a C=O stretching mode of amide, and a C=N stretching mode of a ring including C=C. Further, the FT-IR spectrum of the PHEA-HIS may show a strong band at 1256 $cm^{-1}$, which indicates an in-plane bending mode of a C—H ring and a stretching mode of a C—N ring. Furthermore, a band at 1522 $cm^{-1}$ may correspond to a NH stretching mode of amide, which may correspond to an aspartamide backbone structure. A strong band nearby at 1061 $cm^{-1}$ may indicate a C—N bond of histamine.

It may be shown that a broad band in a range of 3500 to 3200 $cm^{-1}$ for the FT-IR spectrum B of PHEA-HIS is due to —OH of the PHEA-HIS copolymer.

Production of PHEA-HIS Cross-Linked Hydrogel in Accordance with Embodiment 2

In order to produce a PHEA-HIS cross-linked hydrogel, the PHEA-HIS 0.2 g (10 weight/volume %) produced in accordance with the embodiment 1 is dissolved into DMSO (Dimethyl sulfoxide) in a vial to obtain a first mixture. Subsequently, 20 mol % hexamethylene diisocyanate is added to the first mixture, which, in turn, is vigorously agitated at a room temperature. After 2 hours, a thus-formed gel product is received in a closed steel mesh where it is cleaned using a large amount of a distilled water to remove completely an unreacted component and DMSO. Next, a cleaned gel product has been freeze-dried under a vacuum for 3 days, to acquire a PHEA-HIS cross-linked hydrogel (hereinafter, hydrogel) of the present embodiment 2.

Properties of Hydrogel

In order to examine properties of the hydrogel, a FT-IR spectrum thereof based on $CO_2$ is checked. The FT-IR spectrum is obtained substantially using the same equipment and method as those used in checking the property of the PHEA-HIS. The result is shown in FIG. 6.

Figure 6:
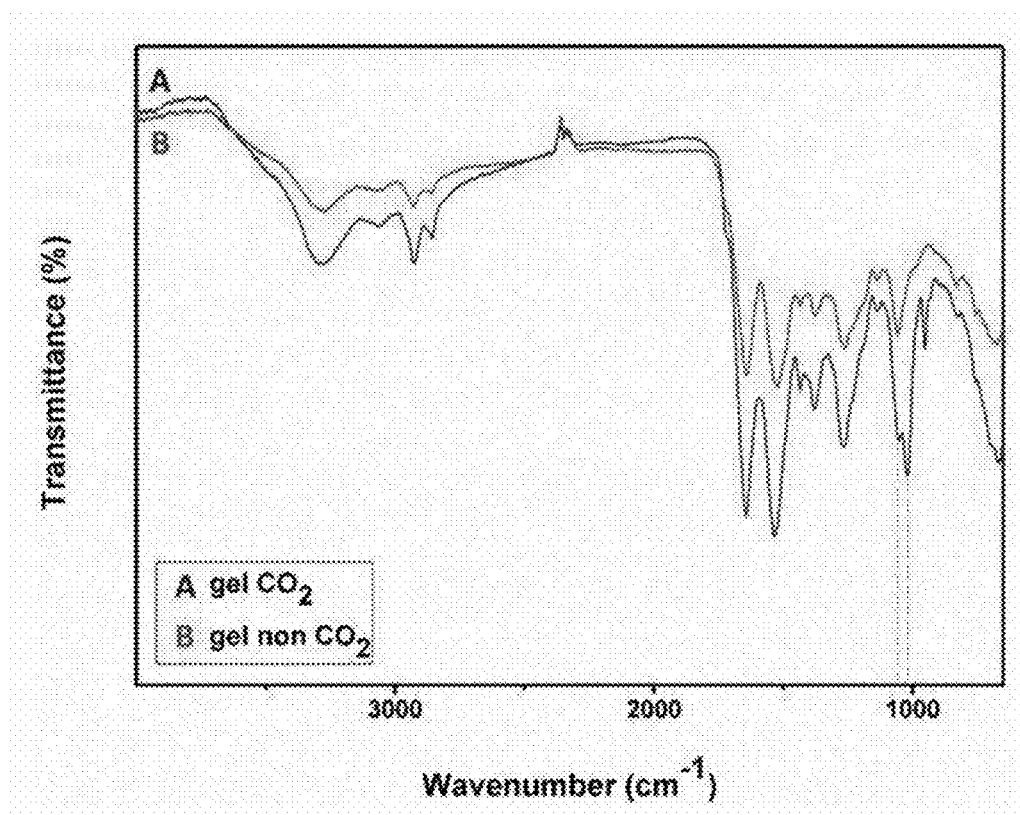
FIG. 6 shows FT-IR spectra of a PHEA-HIS cross-linked hydrogel with and without $CO_2$ treatment.

FIG. 6 shows a FT-IR spectrum of a PHEA-HIS cross-linked hydrogel. In FIG. 6, A indicates the hydrogel FT-IR spectrum when $CO_2$ is present, and B indicates the hydrogel FT-IR spectrum when $CO_2$ is absent.

Referring to FIG. 6, the FT-IR spectrum of the hydrogel in a $CO_2$-free solution (hereinafter, non-$CO_2$ solution) may show the same peak as the FT-IR spectrum of the PHEA-HIS as shown in FIG. 5. To the contrary, the FT-IR spectrum of the hydrogel in a $CO_2$-containing solution (hereinafter, $CO_2$ solution) may show peaks at 1026 $cm^{-1}$ and 956 $cm^{-1}$ respectively, which may mean an imidazole ring of the hydrogel in a conjugate acid imidazolium form.

Swelling Ability of Hydrogel Relative to $CO_2$

The swelling ability of the hydrogel of the present embodiment 2 based on absence/presence of $CO_2$ is examined. The swelling ability of the hydrogel may be indicated as a swelling ratio (SR). The ratio may be measured using a tea bag method. First, quantified hydrogel powders are inserted into a quantified tea bag, which is immersed in distilled water 200 mL as an aqueous medium at a specific temperature and is kept for a predetermined time at it is. Then, hydrogel is collected from the medium. The collected hydrogel is cleaned at its surface using a filtering paper with excess water. A weight of the cleaned hydrogel is measured and a swelling ratio is calculated from the weight measurement. The swelling ratio is defined as a following equation 1:

$$SR = \frac{W_S - W_D}{W_D} \quad [\text{equation 1}]$$

where $W_D$ and $W_S$ indicate weights of the dry hydrogel and swelling hydrogel respectively at an equilibrium state.

Subsequently, $CO_2$ is added into distilled water, and, then, a hydrogel reacting with the distilled water containing $CO_2$ is measured at a swelling ratio thereof. An absorption rate thereof is measured as a function of time. The measurement result is shown in FIG. 7.

Figure 7:
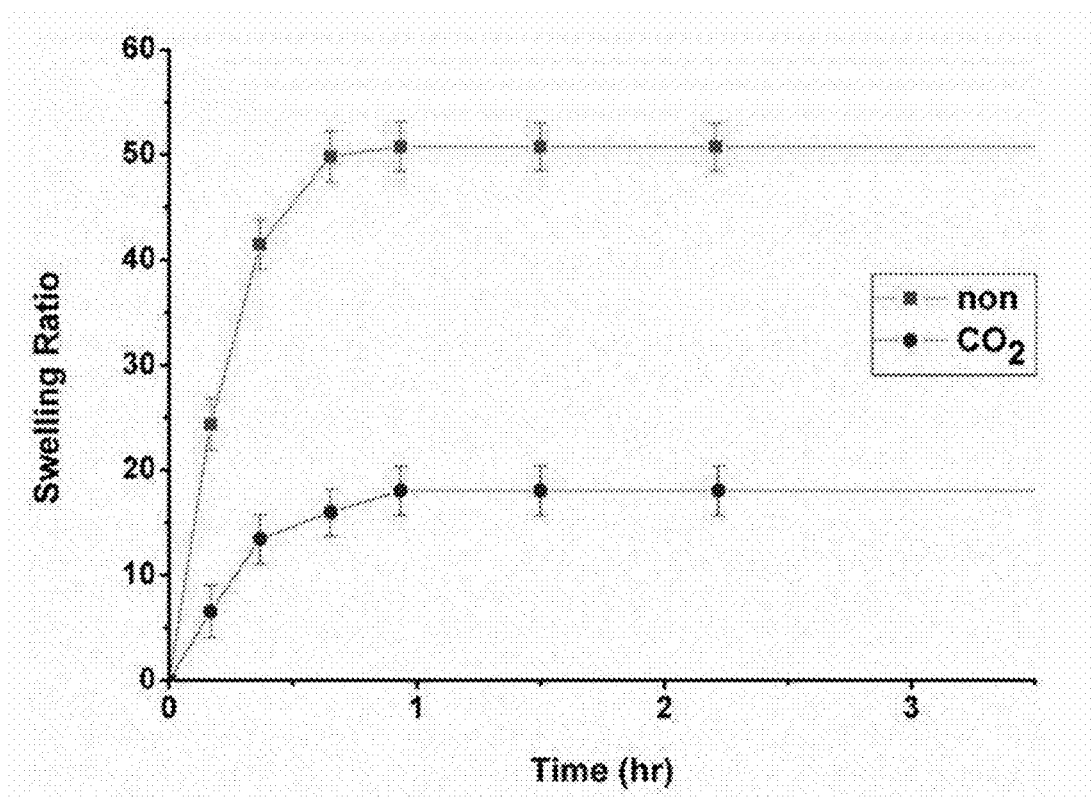
FIG. 7 shows swelling ratios of the PHEA-HIS cross-linked hydrogel based on $CO_2$.

FIG. 7 shows swelling rates of the PHEA-HIS cross-linked hydrogel based on $CO_2$. Referring to FIG. 7, it is confirmed that the swelling ratio of the hydrogel is lower relative to the $CO_2$ solution than relative to the $CO_2$-free solution such as distilled water. This may mean that the imidazole ring of the histamine group is involved as a "proton bank" to receive a proton in a free base, and act as an amphiphilic compound to contribute them when protonated.

Further, when the distilled water contains $CO_2$, a carbonic acid ($H_2CO_3$) is formed, and, thus, pH of the distilled water is decreased to about 3.35. When the hydrogel reacts with an acid solution having pH equal to or lower than 4, imidazole moieties of PHEA-HIS pendants are protonated, thereby to obtain chain rigidity via hydrogen bond interactions within molecules/between molecules between the protonated neighboring imidazole units. Thus, it is conformed that, when the solution contains $CO_2$, the hydrogel is shrunk.

Swelling Ability of Hydrogel Relative to pH

A swelling degree of a hydrogel based on pH conditions is measured which may indicate a pH-stimulation of the hydrogel. The measurement result is shown in FIG. 8.

Figure 8:
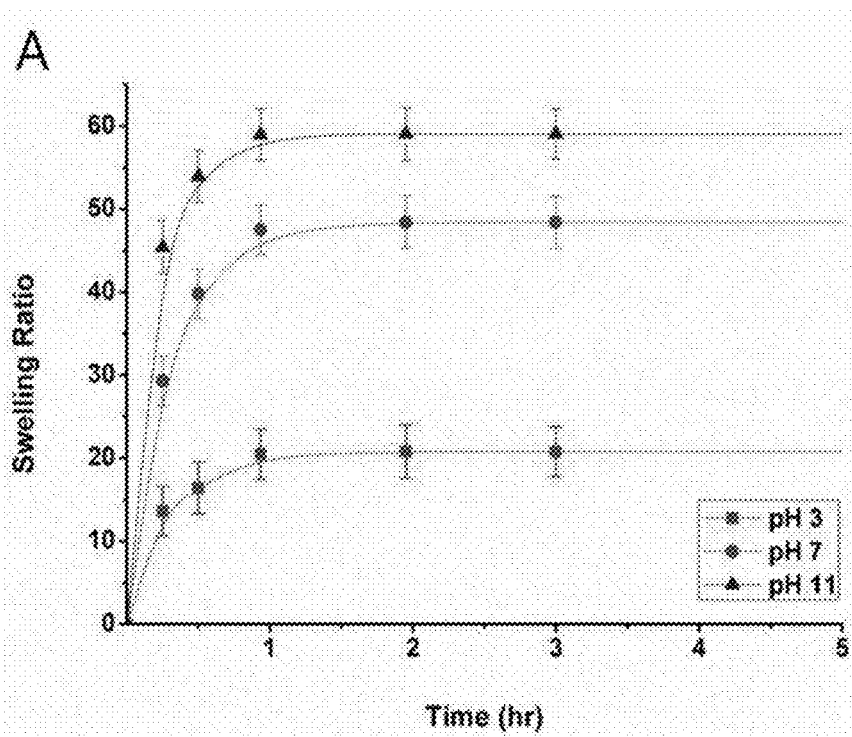
FIG. 8 illustrates a swelling degree of a PHEA-HIS cross-linked hydrogel based on pH conditions.
Figure 8:
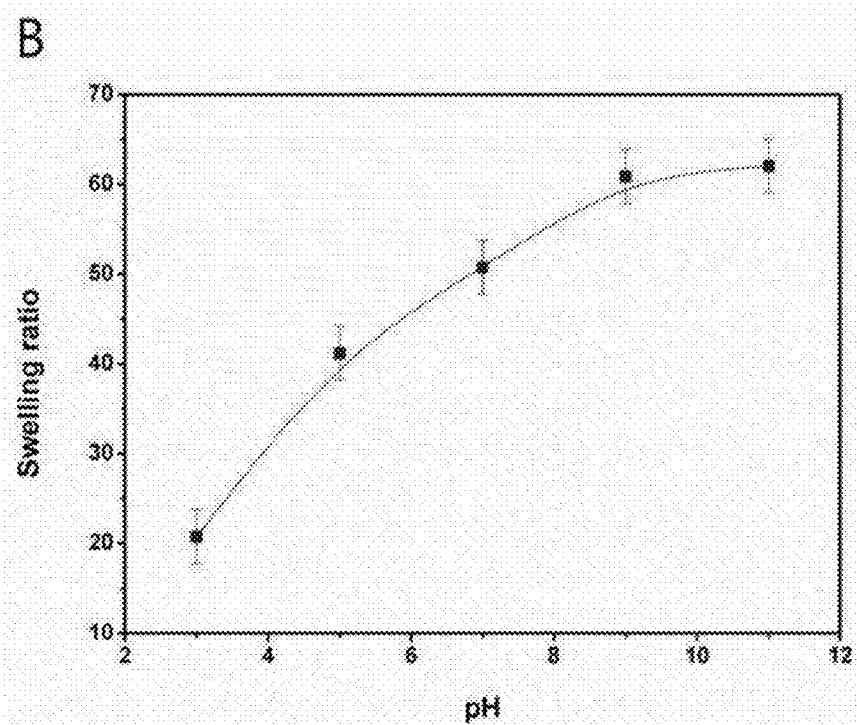

FIG. 8 illustrates a swelling degree of a PHEA-HIS cross-linked hydrogel based on pH conditions. In FIG. 8, A indicates swelling curves of the hydrogel over time, based on pH 3, pH 7, and pH 11 respectively; B indicates a swelling curve of the hydrogel over a pH change.

Referring to FIG. 8A, an equilibrium of swelling of the hydrogel in the aqueous solution is achieved within about 2 hours. When the aqueous solution has pH 3, the swelling degree thereof may be the lowest. When the aqueous solution has pH 11, the swelling degree thereof may be the highest. That is, the higher pH of the aqueous solution is, the higher the swelling degree of the hydrogel is.

Referring to FIG. 8B, it is confirmed that the swelling degree of the hydrogel is proportional to pH of the aqueous solution wetting the hydrogel. This may mean that, in a neutral or alkali environment, the hydrogel is substantially neutral, or ionized as pH value of the solution increases, and, thus, the hydrogel expands to provide a higher swelling ratio, thereby to increase the swelling degree of the hydrogel.

Reversibility of Hydrogel

In order to examine a reaction reversibility of the hydrogel, the hydrogen is subject to repetitions of $CO_2$ and $N_2$ treatments in a solution for a given time, to check a switching state of the hydrogel. The checking result is shown in FIG. 9.

Figure 9:
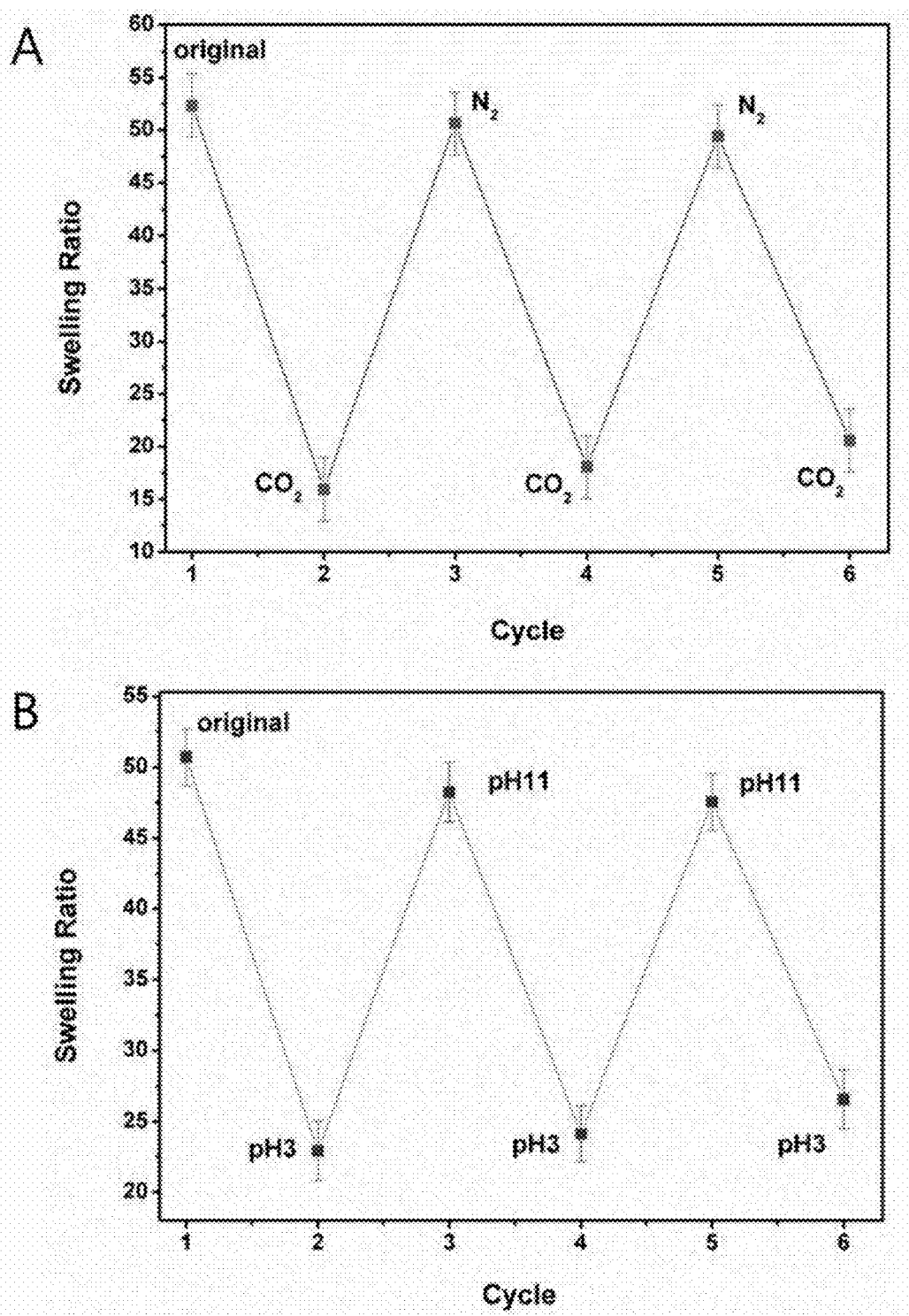
FIG. 9 illustrates a reversibility of a PHEA-HIS cross-linked hydrogel.

FIG. 9 illustrates a reversibility of a PHEA-HIS cross-linked hydrogel. In FIG. 9, A indicates a swelling ratio change of the hydrogel resulting from the repetitions of $CO_2$ and $N_2$ treatments; B indicates a swelling ratio change of the hydrogel resulting from resulting from a pH change.

Referring to FIGS. 9A and 9B, it may be confirmed that the swelling ratio of the hydrogel decreases upon the $CO_2$ treatment, and the swelling ratio of the hydrogel increases upon the $N_2$ treatment. Further, it may be confirmed that the repetitions of the $CO_2$ and $N_2$ treatments may lead to no change in the swelling ratio.

This may indicate that, as described with reference to FIG. 7, the solution containing $CO_2$ has pH decrease to 3.35, thereby to decrease the hydrogel volume; the solution having $N_2$ introduced thereto via a simple $N_2$ bubbling, the solution has pH increase to pH 7.56, thereby to increase the hydrogel volume, that is, to realize swelling thereof.

That is, the swelling of the hydrogel may be reversible, and may repeat many times. This may mean that the reversibility of the hydrogel may be achieved by repeatedly adding $CO_2/N_2$ to the solution to adjust pH of the solution repeatedly.

Swelling Ability of Hydrogel Relative to Metal Ion

The swelling ability of the hydrogel absorbing metal ions is examined. Using metal ions with a large number of ions, for example, copper ions ($Cu^{2+}$), lead ions ($Pb^{2+}$), and nickel ions ($Ni^{2+}$), the swelling ratios of the hydrogel are measured. The measurement results are shown in FIG. 10.

Figure 10:
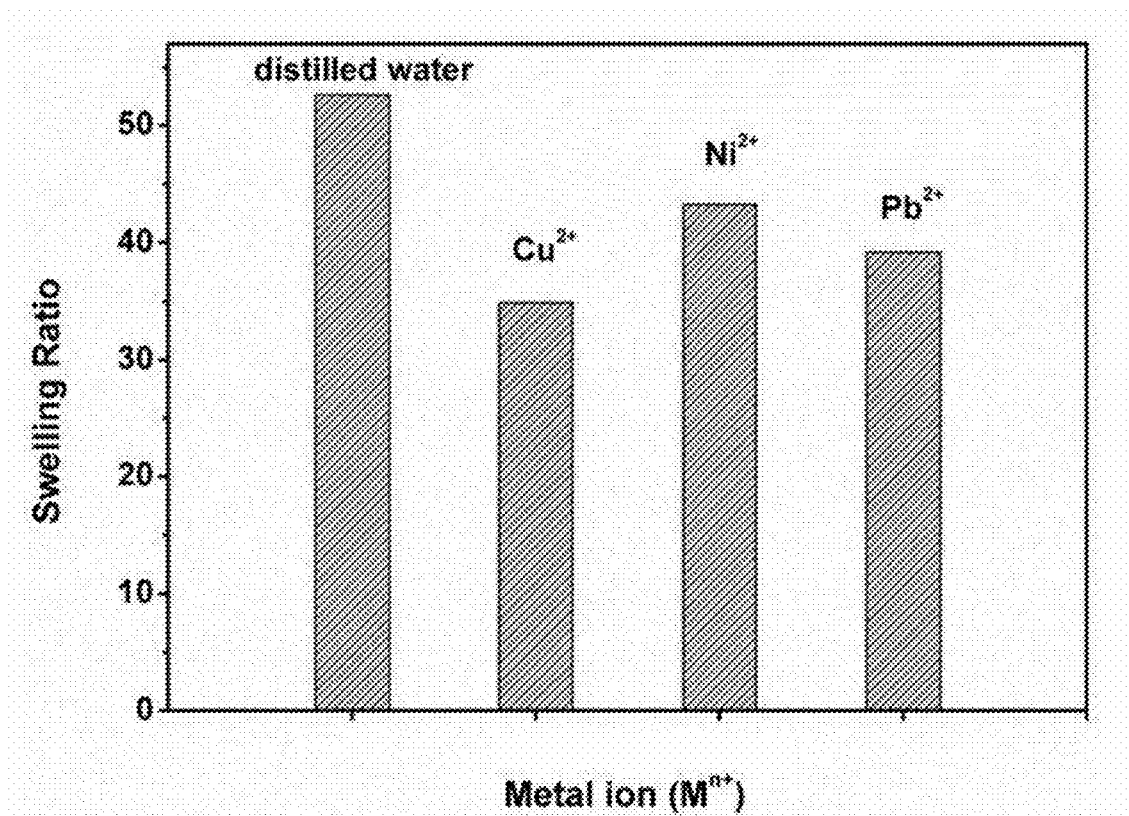
FIG. 10 illustrates a swelling degree of a PHEA-HIS cross-linked hydrogel absorbing the metal ions.

FIG. 10 illustrates swelling degrees of a PHEA-HIS cross-linked hydrogel absorbing the metal ions. FIG. 10 shows swelling ratios of the hydrogel in the distilled water, copper, lead, and nickel ions containing solutions respectively.

Referring to FIG. 10, when being in the distilled water, the swelling ratio of the hydrogel is highest. When being in the nickel ions containing solution, the swelling ratio of the hydrogel is next highest. When being in the lead ions containing solution, the swelling ratio of the hydrogel is third highest. When being in the copper ions containing solution, the swelling ratio of the hydrogel is fourth highest. Compared to the distilled water, the swelling ratios of the hydrogel are lower in the metal ion containing solutions. This may be due to a multivalent coordinate bond between the imidazole group of the polymer backbone in the hydrogel and the metal ions. Thus, this may mean that the hydrogel has the metal ion absorption.

Absorption Degree of Hydrogel

In order to examine an absorption degree of a metal ion by the hydrogel, batch adsorption experiments for a copper ion (Cu(II), $Cu^{2+}$) and a nickel ion (Ni(II), $N^{2+}$) are conducted respectively. The absorption experiments are conducted as an equilibrium experiment using copper sulfate pentahydrate (CuSO$_4$.5H$_2$O) and nickel sulfate hexahydrate.

As for the batch adsorption experiment for the copper ion, copper sulfate pentahydrate (CuSO$_4$.5H$_2$O) is dissolved in 50 mL deionized water, and the total solution is divided into 40 mL of an absorption solution, and 10 mL of an initial solution. Thereafter, the hydrogel 20 mg is added into a vial including the absorption solution.

The batch adsorption experiment for the nickel ion may be conducted substantially in the same manner as the batch adsorption experiment for the copper ion.

Based on the batch absorption experiment results, it may be confirmed that the hydrogel color-changes from a white to a light blue with reaction to the copper solution; the hydrogel color-changes from a white to a light green with reaction to the nickel solution. This may show that the hydrogel absorbs the copper ion and nickel ion in the solution, to allow the color change thereof.

Further, a metal ion absorption degree of the hydrogel is examined. The absorption degrees of the hydrogel are calculated based on difference between ion concentrations of initial and final copper containing solutions and between ion concentrations of initial and final nickel containing solutions. Each of the initial and final copper containing solutions is diluted in a deionized water with a dilution ratio 1 mL:99 mL. Each of the initial and final nickel containing solutions is diluted in a deionized water with a dilution ratio 1 mL:99 mL.

The absorption degree may be defined by a following equation 2 based on a volume 40 mL of the solution, a weight 20 mg of an absorber, and a difference between initial and equilibrium metal ion concentrations in the solution:

$$q(\text{mg/g}) = (C_{in} - C_{eq})\frac{v}{m} \quad \text{[equation 2]}$$

where $C_{in}$ refers to an initial metal concentration (ppm), $C_{eq}$ refers to an equilibrium metal concentration (ppm), V refers to a volume (mL) of the metal solution, and m refers to a weight of a gel absorber.

The concentrations of the copper and nickel ions are measured using a flame atomic adsorption spectrometer (AAS; Buck Scientific 210VGP, US). The volume of the deionized water is finely measured using a 25 mL burette. The pH of the solution is adjusted using HCl (0.1N and 0.01N) and NaOH (0.05N) solutions. The measurement results are shown in FIG. 11.

Figure 11:
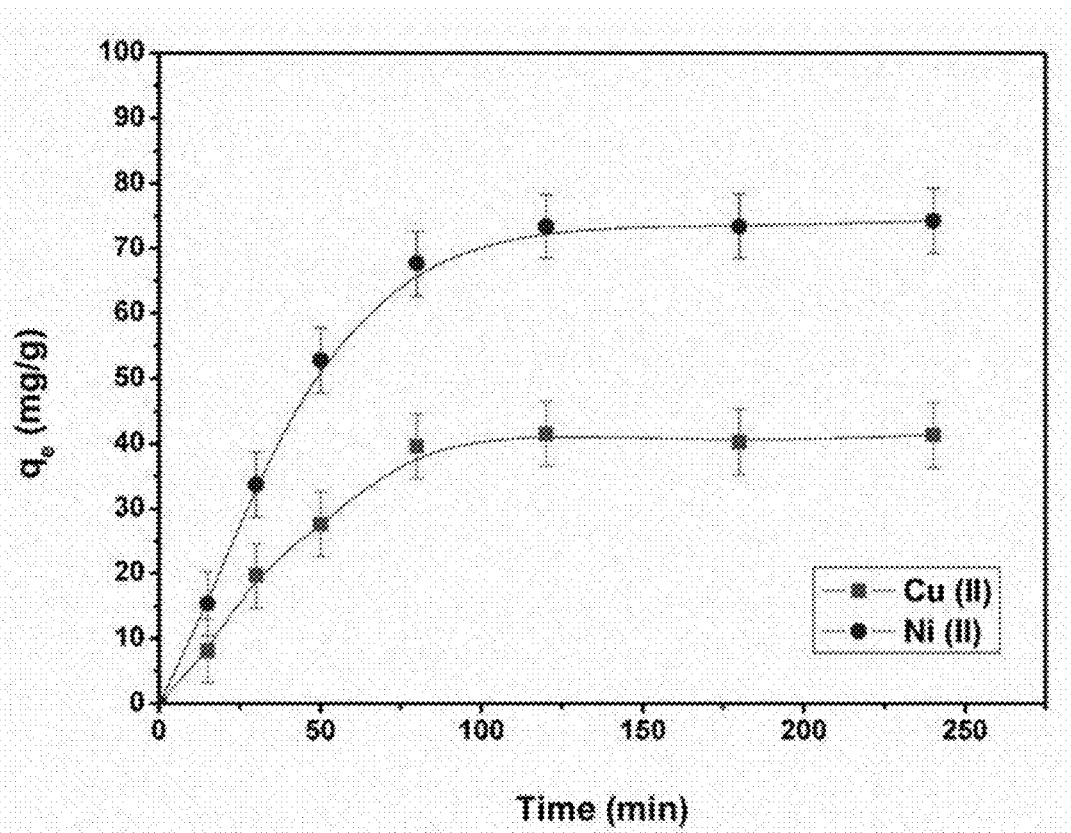
FIG. 11 illustrates metal ion absorption degrees of the PHEA-HIS cross-linked hydrogel over time.

FIG. 11 illustrates metal ion absorption degrees of the PHEA-HIS cross-linked hydrogel over time. Referring to FIG. 11, absorption rates of the copper and nickel ions are initially high, and, after about 80 mins and 120 mins respectively, reach maximum equilibrium levels thereof. This may mean that, because the initial hydrogel has many surface sites for the metal ion absorption, the absorption degree increases as a contact time therebetween increases. Further, it may be confirmed that, after a given contact time, the absorption degree may not increase but reach the equilibrium due to exhaust of the absorption site of the hydrogel.

Subsequently, metal ion absorption degrees of the hydrogel based on concentrations of the metal ions are examined. The examination results are shown in FIG. 12.

Figure 12:
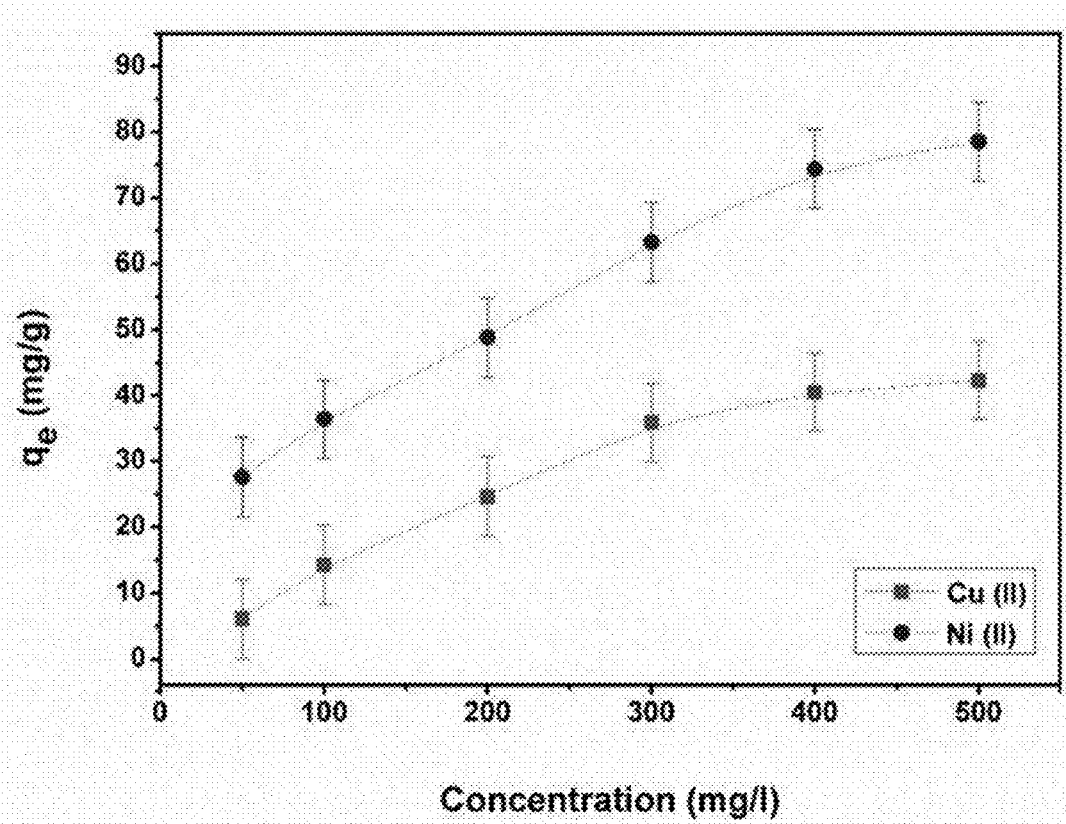
FIG. 12 illustrates metal ion absorption degrees of the PHEA-HIS cross-linked hydrogel based on concentrations of the metal ions.

FIG. 12 illustrates metal ion absorption degrees of the PHEA-HIS cross-linked hydrogel based on concentrations of the metal ions. Referring to FIG. 12, the absorption degrees of the hydrogel increase as the metal ion concentration increase from 50 to 500 ppm. To be specific, in the copper solution, the absorption degree of the hydrogel increases from about 6 mg/g to 42.35 mg/g. In the nickel solution, the absorption degree of the hydrogel increases from about 27 mg/g to 78 mg/g. This may indicate that the nickel ion absorption rate is higher than the copper ion absorption rate by the hydrogel. This may correspond to the fact as described with reference to FIG. 10 that the swelling ratio of the hydrogel relative to the nickel ion is higher than the swelling ratio of the hydrogel relative to the copper ion. Further, since available absorption sites of the hydrogel are small in the high metal ion concentration, the absorption degree of the metal ion slightly increases.

Next, metal ion absorption degrees of the hydrogel based on pH change are examined. The metal ion concentrations of the copper and nickel solutions are 400 ppm respectively. The pH varies between 3 and 5. The absorption degrees based on the pH change are shown in FIG. 13.

Figure 13:
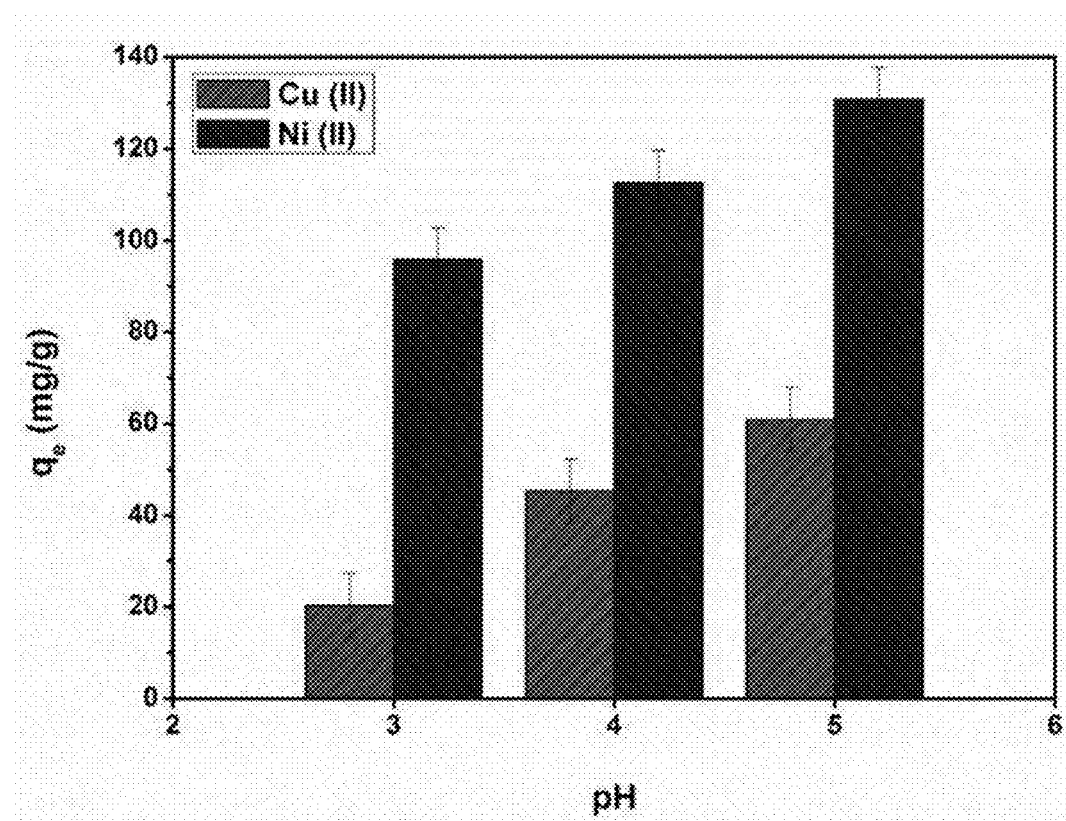
FIG. 13 shows metal ion absorption degrees of the PHEA-HIS cross-linked hydrogel based on the pH change.

FIG. 13 shows metal ion absorption degrees of the PHEA-HIS cross-linked hydrogel based on the pH change. Referring to FIG. 13, the absorption degree of the hydrogel increases as the pH increases for both the copper ion and nickel ion. This may mean that, in a lower pH, the absorption degree is low due to a coordinate complex of the copper and nickel ion and the histamine group of the hydrogel. Further, since, in a low pH, more $H^+$ ions are present, $H^+$ may compete with the metal ion for the absorption sites of the hydrogel, thereby to lead to a reduction of bonds between the hydrogel and metal ions. In this way, in a low pH, the relatively low absorption degree is shown.

That is, pH of the solution may affect not only surface charges and ionization of the hydrogel, but also the heavy metal absorption from the aqueous solution. Thus, the hydrogel may have the higher metal ion absorption level at a higher pH.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

What is claimed is:

1. A hydrogel including a repeating unit expressed as a following formula 3:

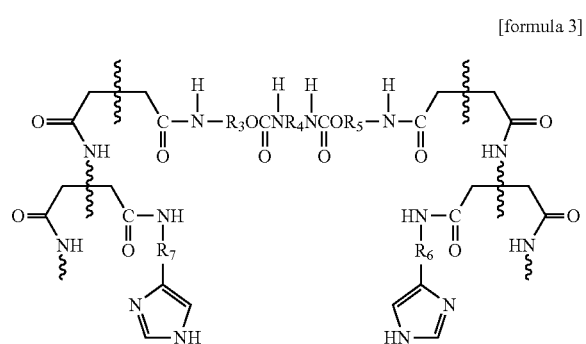

[formula 3]

where each of $R_3$ and $R_5$ independently represents an alkylene group with 2 to 6 carbon atoms, $R_4$ represents an alkylene group with 1 to 12 carbon atoms or an arylene group with 6 to 14 carbon atoms, each of $R_6$ and $R_7$ independently represents an alkylene group with 2 to 6 carbon atoms.

2. The hydrogel of claim 1, wherein the formula 3 is expressed as a following formula 4;

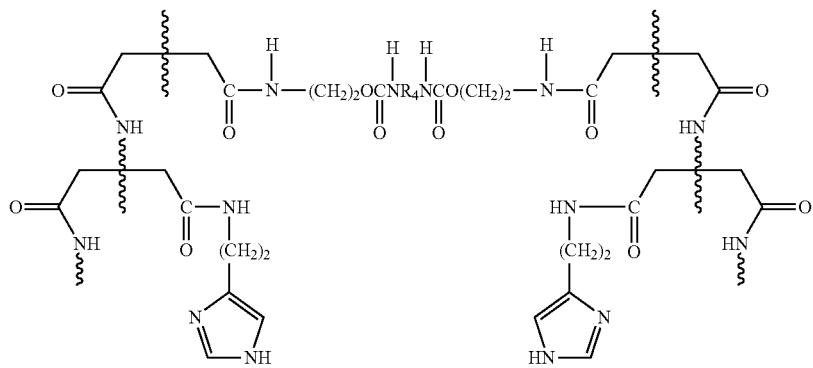

[formula 4]

wherein, in the formula 4, $R_4$ represents an alkylene group with 1 to 12 carbon atoms or an arylene group with 6 to 14 carbon atoms.

3. The hydrogel of claim 2, wherein, when reacted with an aqueous solution wetting the hydrogel, a swelling degree of the hydrogel varies based on pH of the aqueous solution wetting the hydrogel.

4. The hydrogel of claim 3, wherein the variation of the swelling degree allows the hydrogel to act as a sensing material of a pressure sensor.

5. The hydrogel of claim 3, wherein the hydrogel has a reactivity with $CO_2$ in an aqueous solution, wherein the $CO_2$ lowers pH of the aqueous solution, thereby to decrease a swelling degree of the hydrogel.

6. The hydrogel of claim 3, wherein an inert gas in the aqueous solution raises pH of the aqueous solution, thereby to increase a swelling degree of the hydrogel.

7. The hydrogel of claim 2, wherein, when reacted with an aqueous solution wetting the hydrogel, the hydrogel absorbs a metal ion in the aqueous solution wetting the hydrogel.

8. The hydrogel of claim 7, wherein the metal ion absorption of the hydrogel changes a swelling degree of the hydrogel.

9. The hydrogel of claim 1, wherein the hydrogel is formed by cross-linking a polymer including a repeating unit expressed as a following formula 1:

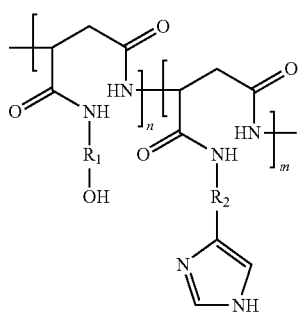

[formula 1]

wherein, in the formula 1, each of $R_1$ and $R_2$ independently represents an alkylene group with 2 to 6 carbon atoms, and each of n and m independently represents 10 to 10,000.

10. The hydrogel of claim 1, wherein, when reacted with an aqueous solution wetting the hydrogel, a swelling degree of the hydrogel varies based on pH of the aqueous solution wetting the hydrogel.

11. The hydrogel of claim 10, wherein the variation of the swelling degree allows the hydrogel to act as a sensing material of a pressure sensor.

12. The hydrogel of claim 10, wherein the hydrogel has a reactivity with $CO_2$ in an aqueous solution, wherein the $CO_2$ lowers pH of the aqueous solution, thereby to decrease a swelling degree of the hydrogel.

13. The hydrogel of claim 10, wherein an inert gas in the aqueous solution raises pH of the aqueous solution, thereby to increase a swelling degree of the hydrogel.

14. The hydrogel of claim 1, wherein, when reacted with an aqueous solution wetting the hydrogel, the hydrogel absorbs a metal ion in the aqueous solution wetting the hydrogel.

15. The hydrogel of claim 14, wherein the metal ion absorption of the hydrogel changes a swelling degree of the hydrogel.

16. The hydrogel of claim 15, wherein the change in the swelling degree allows the hydrogel to act as a sensing material of a pressure sensor.

* * * * *